Patented May 23, 1950

2,508,816

UNITED STATES PATENT OFFICE 2,508,816

PROSTHETIC TOOTH COMPOSITION

Jack De Ment, Portland, Oreg.

No Drawing. Application January 25, 1947,
Serial No. 724,479

3 Claims. (Cl. 260—8)

The present invention relates to a plastic composition for the simulation of teeth and tooth structure for utilization in dental prosthesis.

It is an object of this invention to provide a plastic composition for employment in the fabrication and manufacture of artificial teeth, dentures and the like which will duplicate in appearance and other properties natural teeth.

It is also an object of the present invention to make available an entirely new kind of prosthetic composition which does not wholly require synthetic, artificial and man-made substances in formulation and compounding, permitting a departure from the present art in which the use of many synthetic substances may be dangerous or objectionable.

It is an object of this invention to make artificial teeth and the like from certain components of the natural tooth organ and the like, thereby providing means for the literal replacement of natural tooth material per se, a principle believed to be broadly novel.

In the formulation and fabrication of artificial tooth compositions of the prosthetic type in the present art, duplication is usually attained by the careful blending of various inorganic and organic pigments and dyestuffs which, while more or less satisfactory, fall short of simulating the over-all appearance and other visual characteristics and especially the vital or lifelike property of natural teeth. The synthetic and man-made materials now employed in dental prosthetics do not, for example, present the special physico-chemical properties associated with and typical only of the crystalline organo-inorganic system which comprises the enamel of human or other animal teeth. Investigation conducted thus far in the laboratory seems to have been completely unsuccessful in preparing the synthetic analog, physically, chemically and biologically identical with the genuine article.

Briefly, and as will be fully disclosed subsequently herein, the present invention does not consist of the exclusive employment of organic or inorganic pigments and dyestuffs, as well as fillers or other agents presently used in the dental prosthetic art, and at the same time does not exclude certain of these materials as are well known in the art as of beneficial values in reinforcing certain features of the present invention, but this invention does comprise a prosthetic composition which duplicates the tooth by using the natural tooth or materials derived therefrom. Evidently, then, among the fundamental points of this invention is that it is perhaps useless to try to improve upon nature when the human body or complicated tissues thereof are concerned.

Herein, the terms "tooth," "teeth" and "tooth enamel" will be taken to embrace not only the anatomical and zoological meanings of these words and expressions, but especially the meanings as they are taken in the science of comparative vertebrate anatomy. Thus, these terms and expressions are ordinarily meant one or more of the hard, bony appendages borne by members of the animal kingdom of organisms, usually on the jaws, in the mouth of most vertebrates.

Likewise, the preference and utilization of certain parts of the mammalian or other tooth material or structure is favored and preferred, e. g., the enamel freed of dentine and other tissue of the tooth organ.

In the present invention, I have found that natural tooth enamel is always to be preferred, as is pointed out infra, and it can be formulated with one or more of several kinds of plastic or synthetic resin, as desired, with the result comprising an artificial tooth or the like made in part from natural tooth enamel.

Thus, two of the elements in this invention comprise a plastic carrying, suspending or base medium, and, natural tooth enamel that has been suitably freed of organic material, tissue debris and the like and otherwise rendered satisfactory, according to the disclosure set out herein and subsequently, for formulation and compounding with the plastic. Thus, a preferred and illustrative form of the present invention comprises say fine particles of natural tooth enamel carried in a body of acrylic resin or plastic to an extent and degree to insure in the product the appearance of natural tooth enamel.

However, for evident reasons, it is the preference in reducing to practice the present invention to suitably treat, prepare, refine, isolate or otherwise make satisfactory for use the teeth and enamel organ materials. Briefly then, mammalian teeth from which the enamel is to be isolated, by hereinafter-given methods or the like or other methods known in the art, are prepared so that discolorations from usage and the like in the living state within the animal's buccal or other tooth organ containing cavity or region are removed; so that extraneous dentine, cementum, pulp and soft tissues are removed; so that water is completely or partly removed; and so that the final particle size of the isolated enamel is suitable for compounding with or formulation into a plastic carrier or base, resulting in the accomplishment of the objects set forth supra. The examples, which are illustrative, set out infra, disclose in detail methods and procedures which have been followed with success, and, in certain instances, which are to be preferred.

Moreover, for purposes of this application, plastic or resin carrier, suspending, bed, or bonding material is not necessarily limited to one species or variety of the many plastics and synthetic resins that are known, have been employed in the art, or offer potentialities for use; however, it is the preference in the present application to formulate this invention with an acrylic ester plastic, say ethyl methacrylate or methyl methacrylate, according to methods well known in the prosthesis science and art. A thermoplastic plastic like an acrylic ester offers many advantages, particularly in its independence of expensive and complicated equipment, specialized knowledge, and the like. But other plastics and synthetic resins may be employed, and examples of these include cellulose ester plastics, vinyl resins and polystyrene plastics, all of which are thermoplastic plastics, and possess a degree of transparency which is requisite but best fulfilled by the acrylic ester plastics, in producing the present invention.

I prefer synthetic acrylic resin as a bonding agent because when set it has a toughness far exceeding any dentine that nature provided in any tooth structure, and a hardness comparable on the Moh scale with that of tooth enamel without brittleness. This compares with the natural tooth in this way: Nature used the relatively brittle crystalline enamel in a group of very small rods, presented end on, to form a wearing surface. The substitute presents a surface of very fine pieces of natural enamel, each one of which will have an exceedingly thin layer of bonding agent where it contacts other similar particles, should this be the case in making up the bulk of the artificial tooth composition. The enamel furnishes the appearance of the tooth and the bonding agent the strength and toughness. Furthermore, acrylic resins are not as prone to the action of many substances taken into the mouth as natural enamel, and acrylic resin is not for example highly susceptible to stains from tobacco and the like.

Singly, a compact mass of pure enamel would be unsuitable since its brittleness and semi-glassy-like characteristics on breakage would be conducive to a short lifetime, for wear and use would be prone to chipping; Nature has provided for such a condition, as herein described, by underlying the layer of brittle enamel with a resilient bed of dentine and the like; the present invention accomplishes a similar end in that the plastic or resin bonding agent or cementitious medium provides the resiliency necessary, without which chipping and breaking would take place.

The formulation and processing of plastics, like any acrylic ester, is well known in the art; hence, it is not deemed necessary to review the art in this field, except as it pertains to the production of the present invention. Likewise, methods are also known in the art for preparing and isolating certain of the constituents of the tooth organ, such as enamel, and while it is not necessary to review this art as well, details are given in the examples, infra, which expedite the preparation and formulation of the constituents and modifications of the present invention in view of the fact that in this invention departures must at times be made from the old art to provide practicable results.

In processing the acrylic ester several techniques are in vogue in the present art. Frequently the exact method depends upon the prosthetic being produced, and an example follows: For mixing at room temperature, three parts of acrylic powder (the polymer) and one part of acrylic liquid (the monomer), both by volume, are mixed in a glass or porcelain vessel, and thoroughly spatulated. An air-tight cap is screwed over the top of the mixing vessel, and the mixture is allowed to stand in the jar until when spatulated it no longer adheres to the sides and can be removed in one mass. It is then kneaded with the fingers and rolled between the palms of the hands. Stickiness is seen on squeezing a small piece between the thumb and first finger, if this property is present. When the last trace of stickiness has disappeared, the mixture is ready to pack in the mold or flask. The total mixing time is generally 5 to 10 minutes at room temperature. A warm flask is employed, and this is usually packed with moist cellophane (hydrocellulose film) or tin foil. The flask is then closed slowly and easily, after which it is opened and additional material added as needed. The overflow is trimmed off with a warm knife, and the trial pack repeated. When the flask is fully packed and the overflow has been removed, the cellophane or tin foil is taken out and the final closure made.

In curing the acrylic ester plastic the flask is placed in cool water, the temperature then being raised to boiling in about an hour, the immersion continuing at boiling temperature for a half an hour. The flask is then allowed to bench cool for 15 minutes and finally cooled in tap water.

Whereas processing and curing with solid, polymeric particles of acrylic resin and the use of the monomeric liquid is herein given as a preferred example of the technique in formulating and making-up of this invention, acrylic resin in other forms is not excluded. Thus, the semi-polymerized, viscous acrylic ester may be used, according to means well known in the art.

If it is desired to whiten the prosthetic product prepared by the means of the present example, less than one per cent of the weight of the enamel powder may be replaced by a substance like titanium dioxide. The amount replaced will be governed by the degree of whiteness and opaqueness desired, and as is well known in the art, this may possess wide latitude. One-tenth to four-tenths per cent by weight of titanium dioxide in the enamel powder provides an example of usable composition.

*Example 1*—The present example is a presently preferred illustration of the form of the present invention in which whole tooth organ material is not substantially employed; rather a select portion thereof, the enamel or enamel-like constituent of the tooth organ.

Natural tooth enamel has never been synthesized, though it has been analyzed from time to time. Natural mammalian tooth enamel, such as that from man, varies from the mineral apatite, which it resembles, five, to topaz, eight, on Moh's hardness scale, being by far the hardest tissue in the body. The specific structure and hardness of natural tooth enamel render it brittle, which is particularly apparent when the enamel loses its foundation of sound dentine in the tooth organ. Enamel is cleavable and splits along the general direction of the enamel rods in cases of fracture or in cavity preparation. The crystal-will permit the production of enamel particles with dimensions approximating the width of the natural rods or prisms in situ. Thus, a number 200 sieve with openings 0.0029 or 0.003 inch wide pass particles of approximately the same size as the width of such a crystal unit of the enamel in situ. In this invention, such particles are haphazardly arranged, contrasting to a columnate arrangement in situ; nevertheless, each exposed particle face, whether in the present invention or in the natural tooth enamel, is of very similar if not identical area.

The dental prosthetic composition comprising the present invention is almost identical with the natural tooth in appearance. Under ultra-violet light, which is always a critical test of such a prosthetic, the fluorescence is identical with the natural, living tooth.

Tooth organ material for utilization as in the form of this invention set out in Example 1 may be obtained from humans or from animals, slaughter houses providing a convenient source in the latter instance.

Additives like titanium dioxide, cadmium red, synthetic dyestuffs, inorganic pigments, fillers and opacifiers are all optional in connection with the present invention, and may be employed in part according to the principles well known in the art concerning these materials.

The present invention may take several forms; as a final artificial tooth or set of teeth for replacement prosthesis, or, as capping, filling, or cementing material in reparation prosthesis.

I claim:

1. An artificial tooth prosthetic composition comprising tooth enamel bonded with a thermoplastic material, the said tooth enamel being in particle form, and the said thermoplastic material being a polymerized ester of acrylic acid.

2. An artificial tooth made up from powdered hard enamel from animal teeth characterized by particles of natural tooth enamel bonded together in a thermoplastic resin, the said resin comprising a polymerized ester of acrylic acid, effective to simulate the appearance of the tooth organ from which the said hard enamel was derived.

3. As a new composition, pulverous particles of natural tooth enamel bonded together with a polymerized ester of acrylic acid into a solid having a high cleavage resistance, the said tooth enamel comprising up to approximately 75 per cent by weight of the said polymerized ester.

JACK DE MENT.

REFERENCES CITED

The following references are of record in the file of this patent:

UNITED STATES PATENTS

| Number | Name | Date |
|---|---|---|
| 1,885,563 | Bormans | Nov. 1, 1932 |
| 2,420,570 | Shapiro | May 13, 1947 |

OTHER REFERENCES

Hitchins et al., British Patent Provisional Specification No. 943, A. D. 1852, 1 page.

Tylman et al., Acrylics, Lippincott, 1946, pp. 32 and 35.